(No Model.)
A. ANDERSON.
SPLICE FOR WIRE.
No. 414,362. Patented Nov. 5, 1889.
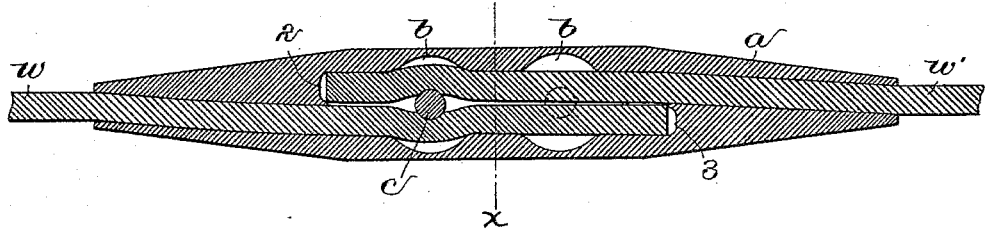
Witnesses:
Howard F. Eaton.
Frederick L. Emery.
Inventor:
Albert Anderson,
by Ormsby & Gregory
Attys.

UNITED STATES PATENT OFFICE.

ALBERT ANDERSON, OF BOSTON, MASSACHUSETTS, ASSIGNOR TO CHARLES L. EDGAR, TRUSTEE, OF SAME PLACE.

SPLICE FOR WIRE.

SPECIFICATION forming part of Letters Patent No. 414,362, dated November 5, 1889.

Application filed July 8, 1889. Serial No. 316,764. (No model.)

*To all whom it may concern:*

Be it known that I, ALBERT ANDERSON, of Boston, county of Suffolk, State of Massachusetts, have invented an Improvement in Splices for Wire, of which the following description, in connection with the accompanying drawings, is a specification, like letters on the drawings representing like parts.

Very considerable trouble is now experienced in securely splicing together copper and other wires, both plain and insulated, and many devices have been devised for such purpose.

In my efforts to make a very strong, durable, and close splice I have provided a strong metallic sleeve with holes leading from its opposite ends toward its center, where the said space is enlarged, in order that the ends of the wire to be electrically spliced together may pass each other, a pin or pins extended through a hole in the splice and between the overlapping ends of the wire serving to hold the wires and splice together.

My invention consists in a splice composed of a metal sleeve chambered to permit the ends of the wires to pass or overlap stops in the said sleeve, and a locking-pin to enter the said sleeve and pass between the overlapping wires and bend them into the enlarged chamber, substantially as described.

Figure 1 in side elevation represents two wires united by my improved electrical splice; Fig. 2, a longitudinal section of the splice and wires shown in Fig. 1, and Fig. 3 is a cross-section in the line $x$, Fig. 2.

The metal sleeve $a$, forming the chief part of my improved splice, is preferably cylindrical in cross-section and conical at its ends, as shown in the drawings. The metal sleeve, if in one piece, may be formed in whole or in part by casting the body of the sleeve about suitable cores, which, when removed, leave one or more central chambers, as $b\ b$, with holes or passages leading therefrom out through the ends of the sleeve to permit the introduction into the sleeve of the two wires $w\ w'$, of copper or other metal, and plain or insulated, the ends of the said wires overlapping, as shown in the drawings, Fig. 2, and preferably the sleeve will have shoulders or stops, as 2 3, for the ends of the wires to abut against. After the wires have been inserted I drive through holes previously made in the said sleeve at substantially right angles to the said wire one or more metal pins or bolts, as $c$, which latter, as they are being driven, pass between the said wires, as at the left of Fig. 2, and bend the same laterally into the openings or chambers $b$, so that a defined bend or crook is put into the wires, holding the same firmly in the sleeve and making a close electrical joint. Preferably I shall provide the sleeve with two or more openings $b\ b$. In Fig. 2 I have shown but one pin or bolt as driven into place, the dotted lines at the opposite side of the wire showing the hole for the reception of the other pin or bolt to in like manner bend the two wires laterally into the space $b$.

To uncouple the wire, the pins or bolts may be driven or forced out, and then by the application of sufficient force the wire may be drawn out of the sleeve.

I do not desire to limit my invention to making the sleeve of the exact shape shown externally; but the shape shown is preferred.

I claim—

The combination, with a metal sleeve having passages leading therein from its ends and one or more chambers, as $b$, and stops, as 2 3, of two wires inserted in the said passages and overlapped in the said chambers, and one or more metal pins driven through the said sleeve and between the said wires, the said pins bending the wires into the said chambers, substantially as described.

In testimony whereof I have signed my name to this specification in the presence of two subscribing witnesses.

ALBERT ANDERSON.

Witnesses:
 GEO. W. GREGORY,
 B. DEWAR.